United States Patent [19]

Brown et al.

[11] Patent Number: 5,021,094
[45] Date of Patent: * Jun. 4, 1991

[54] GROUTING COMPOSITION

[75] Inventors: Richard K. Brown; Robert W. Stichman, both of Billings, Mont.

[73] Assignee: Wyo-Ben, Inc., Billings, Mont.

[*] Notice: The portion of the term of this patent subsequent to Oct. 23, 2007 has been disclaimed.

[21] Appl. No.: 601,348

[22] Filed: Oct. 23, 1990

Related U.S. Application Data

[63] Continuation-in-part of Ser. No. 235,422, Aug. 12, 1988, Pat. No. 4,964,918.

[51] Int. Cl.$^5$ .................... C04B 24/24; C04B 24/02
[52] U.S. Cl. .................................................. 106/803
[58] Field of Search ........................................ 106/803

[56] References Cited

U.S. PATENT DOCUMENTS 4,953,620 9/1990 Bloys et al. .................. 106/803
4,964,918 10/1990 Brown et al. .................. 106/811

Primary Examiner—Theodore Morris
Assistant Examiner—David M. Brunsman
Attorney, Agent, or Firm—Berman, Aisenberg & Platt

[57] ABSTRACT

A grouting composition for sealing a borehole or other cavity contains 90–99.9% finely divided water swellable clay and 0.1–10% polyacrylate thinner having a molecular weight of about 5,000 to 95,000. The grouting composition is mixed with fresh water to provide a completely reswellable, unflocculated, easily placed, low permeability sealing composition. The thinner allows a very high concentration of water-swellable clay in the composition. A preferred grouting composition contains 98–99.9% sodium bentonite and 0.1–2% polyacrylate thinner of molecular weight of about 2,000 to 50,000. In use, 50lb. of the preferred grouting composition is mixed with 11–14 gallons of fresh water, to provide a grouting mixture which includes about 25–40% reswellable solids.

33 Claims, No Drawings

GROUTING COMPOSITION

RELATED APPLICATION

This application is a continuation-in-part of Ser. No. 235,422, filed Aug. 12, 1988, now U.S. Pat. No. 4,964,918, the entire disclosure of which is incorporated herein by reference.

FIELD OF THE INVENTION

The invention relates to an improved grouting composition for sealing earthen boreholes and other subsurface cavities.

BACKGROUND OF THE INVENTION

Grouting compositions have been used for many years to minimize movement of water or other fluids into, through and out of wells and other subsurface cavities. Grouts have also been used to limit the movement of water and other fluids into buried foundations and other subsurface structures. Grout compositions incorporating bentonite are known to exhibit the characteristic of low permeability to fluids. In these compositions the degree of impermeability is directly related to the amount of bentonite present. Prior to the development of this invention, high concentrations of bentonite in grout mixtures have made the mixtures rapidly become too thick, viscous and/or sticky to be useful. Such mixtures can quickly clog pumping equipment and related conveying hoses and pipes, making them unusable.

Mason, U.S. Pat. No. 4,463,808 describes a composition in which bentonite, especially granular bentonite, or other water swellable clay is added to a premixed water and polymer solution The polymer is a water dispersible hydrolyzed polyacrylamide which inhibits the swelling of the clay for a sufficient period of time to allow the fluid grout thus produced to be placed at the desired location in the well borehole. Granular bentonite is stated to be particularly desirable for use in this composition because finely ground bentonite swells more rapidly and must be more rapidly emplaced in the well bore. The amount of bentonite indicated for this composition is from 2 to 4 pounds per gallon of water.

Messenger, U.S. Pat. No. 2,861,636, describes a clay cement including silica, alumina or silica-alumina and a water soluble phosphoric acid salt. Hughes, U.S. Pat. No. 3,986,365, describes use of a three-part mixture of soil, bentonite and very high molecular weight viscosifying polymer for forming an enclosure and sealing a water-holding area. The viscosifying polymer allows the amount of bentonite to be reduced.

Armentrout, U.S. Pat. No. 3,028,913, discloses a non-reswellable sealant composition for recovering lost circulation in wells. The composition includes hydratable material, inhibitor and a delayed action accelerator. Caron, U.S. Pat. No. 3,111,006, discloses a composition for injection into soil, including swellable clay and additives necessarily including alkali silicates.

Harriett, U.S. Pat. No. 4,696,698, 4,696,699 and 4,797,158 describe grouting compositions containing 10 to 80% bentonite or other water swellable clay, 10 to 80% non-swelling particulate filler such as fly ash, diatomaceous earth or calcined clays, 0.5 to 35% water soluble silicates as solidifiers, 0.5 to 35% gelling agent and 0.5 to 35% multivalent cation source. This composition optionally also includes 0.5 to 5.0% sodium pyrophosphate as a dispersing agent for the water swellable clay. Harriett cautions against the use of polymer treatment of the water swellable clay, using salts of polyacrylic acid or other polymer agents, in order to avoid premature gelling of the composition.

Alexander, U.S. Pat. No. 4,886,550, describes a flexible grouting composition and method including 80.0 to 99.5% water-swellable clay, 0 to 20% solid, particulate filler and 0.5 to 20.0% dispersing agent for the water-swellable clay, particularly an inorganic dispersing agent such as sodium acid pyrophosphate.

SUMMARY OF THE INVENTION

The present invention is directed to an easily prepared, one part, water mixable, easily pumped and placed, grout composition which exhibits a low permeability to water and other ground fluids and contains a very high content of water swellable, fully reswellable, colloidal clay solids. A composition of the invention contains 90.0-99.9% of a water swellable, colloidal clay, such as bentonite, and 0.1-10% of a thinner, such as certain low molecular weight polyacrylate polymers, where the percentages are by weight of the composition prior to mixing with water. The thinner functions as an agent for significantly increasing the content of water swellable colloidal clay solids in the prepared grout mixture beyond that obtainable without such a thinner. The grout mixture is prepared by adding 50 lb. grout composition to 9-18 gallons of water, preferably to 11-14 gallons of water, to provide a grout mixture having about 25-40% reswellable solids, preferably about 30-35% reswellable solids. No gelling or flocculating agents are used in the composition of the invention, resulting in uninhibited reswelling potential of the prepared grout upon rehydration following shrinkage due to desiccation. The invention is useful, for example, as a grouting, cementing or plugging agent in boreholes around well casings during well development, in boreholes during well abandonment procedures in order to prevent fluid movement within the borehole and to stabilize the well, and for waterproofing foundations and other subsurface earthen structures which may come in contact with ground fluids. The composition of the invention is useful in any subsurface condition or environment where it is necessary to limit fluid movement or contact of structures with fluids.

DETAILED DESCRIPTION OF THE INVENTION

A composition of the present invention is used, for example, for grouting well casings where the annular well space between the casing and the borehole wall must be sealed, for grouting monitoring well boreholes where sections of the borehole must be sealed, and for grouting well boreholes during well abandonment to fully seal the entire borehole. A grouting composition of the present invention may also be used for grouting, pressure grouting and sealing subgrade foundation structures in order to limit their contact with, and permeability to, ground water and other fluids. Further, the present invention may be used in any subgrade application where it is desirable or necessary to limit the movement of ground water or other fluids.

A composition of the present invention may also be used as a flexible, low permeability backfilling and plugging material for use in cementing conduit and cables in subsurface trenches or boreholes, and as an electrically transmissive medium for back filling around electrical grounding devices.

A preferred grout composition of the invention consists of a water swellable clay, such as bentonite, in an amount of 98.0 to 99.9% by weight and a water dispersible polyacrylate thinner in an amount of 0.1 to 2% by weight. No gelling or flocculating agents, or non-swellable fillers of any kind are used. This composition is added to 11–14 gallons of fresh water to provide a grout mixture having about 30–5% reswellable solids.

The water swellable clays useful in the composition of the present invention include any colloidal clay mineral which will swell upon hydration with water. The colloidal clay may be any member of the dioctahedral or trioctahedral smectite group or mixtures thereof, including bentonite (montmorillonite), beidellite, nontronite, hectorite and saponite. Additionally, the clay may also be attapulgite or sepiolite or a mixture of these two clay minerals, or a mixture of these two clay minerals with one or more minerals of the smectite group.

In its preferred embodiment, the colloidal clay mineral is sodium bentonite (sodium montomorillonite) which is finely ground so that approximately 80%, by weight, will pass through a 200 mesh U.S. standard sieve. The fine grind of the colloidal clay aids in its rapid mixing with and dispersion in water. A finely ground colloidal clay is also preferred in order to limit the problems encountered when coarser granular colloidal clays are used, wherein the large clay particles become sticky upon hydration and, being unable to rapidly disperse in the mixing water due to their large size, may aggregate, by particle to particle adhesion, and cause plugging of the pumping equipment and the conveying and placement pipes, tubes and hoses.

Notwithstanding the use of finely ground clay in the preferred embodiment of the invention, granular clay may also be used with equal success provided that it is thoroughly mixed with the water prior to placement until the clay is substantially dispersed and few coarse particles remain in the mix. The problem of particle to particle adhesion observed in a water and clay mixture when granular bentonite is used, is overcome by the use of finely ground colloidal clay because clumps of finely ground clay particles, formed by particle to particle adhesion are easily broken up and do not clog pumping and conveying equipment.

As a result, in its preferred embodiment, a composition of the invention may be placed within the ground cavity, by pumping, immediately after adding the finely ground dry clay to the mix water, while the mix is still very lumpy and before substantial mixing and dispersion of the clay solids in the mix water has occurred. Alternatively, the mixture may be mixed until the clay solids are fully dispersed in the mix water, yielding a thick, paste-like consistency, before placement in the ground cavity. The amount of mixing and degree of dispersion of the clay solids in the mix water does not affect the in-place characteristics or the sealing capability of the composition in any way.

When dispersed in an aqueous solution, water swellable colloidal clay crystals become oriented in positions of minimum free energy. Most commonly this results in positively charged crystal edges being oriented toward the negatively charged crystal surfaces of adjacent clay crystals. In the absence of agitation, this orientation results in the formation of gels in the clay suspension. Both the rate of gel formation and the ultimate viscosity of the gel are dependent upon the concentration and type of electrolytes present in the suspending water and the concentration of clay. Higher concentrations of electrolyte and/or clay yield more rapidly forming and higher viscosity gels.

Clay thinners function by bonding of negatively charged sites on the thinner molecule with positively charged sites exposed on the edges of each clay crystal through the process of chemisorption. This bonding masks the positive charge on the clay crystal edge and inhibits the orientation of the clay crystals into gel forming structures, thereby keeping the clay crystals dispersed in the suspending water in a low viscosity fluid form.

In the composition of the present invention, the thinner is used to maximize clay crystal dispersion in order to reduce initial viscosity and delay the onset of gel formation. Thus, a much higher concentration of water swellable colloidal clay solids may be added to the water mix than would otherwise be possible. Water swellable colloidal clay solids contents of about 25 to 40% may be achieved through proper balancing of the thinner and clay components of the invention. The actual concentration of water swellable colloidal clay solids achieved is also a function of the specific application requirements and of the type of mixing, pumping and conveying equipment used. The high water swellable colloidal clay solids content mixture thus obtained will remain pumpable indefinitely for as long as the mixture is continuously agitated. It will also remain pumpable for an hour or more in the absence of agitation.

In this preferred embodiment, the thinner used in the present invention is a water dispersible, sodium salt of a polymeric carboxylic acid with a low molecular weight, under about 100,000, preferably under about 95,000, in the range of about 2,000 to 95,000, preferably 2,000 to 50,000, and more preferably about 2,000 to 5,000 A molecular weight of about 50,000 to 95,000 is also useful. Polymer thinners are distinguished from other clay thinning agents by their efficiency of activity i.e., very small amounts of polymer thinner yield significant thinning affects. It is particularly advantageous if the polymer thinner has a narrow molecular weight range, i.e. if the polymer thinner is a narrow polydispersity, low molecular weight polymer, which yields increased efficiency of thinning when compared with other polymer thinning agents. Polymer thinners are distinguished from other polymeric clay treating agents by their low molecular weight which, for commercial application is under about 100,000, by their chemical makeup which consists of highly anionic polyacrylate polymers having at least 60% anionic carboxyl groups, and by their method of activity which causes them to bind extensively to the positively charged clay crystal edges and inhibit the formation of gel structures in clay slurries, thus allowing a higher concentration of clay particles to be dispersed in the water.

Other polymeric clay treatments, such as those of the prior art which inhibit swelling by inhibiting water absorption of the clay (Mason, U.S. Pat. No. 4,463,808), have significantly higher molecular weights which, for commercial applications, usually are over 1,000,000, and have chemical compositions which are only about 25–40% anionic and are either partially hydrolyzed polyacrylamide or are polyacrylate-polyacrylamide copolymers, and which function by encapsulating the clay particles, binding them together and reducing the rate of water movement into the particles.

Research has shown that polyacrylates of the type used in this invention are poor inhibitors of swelling for water swellable clays due to their relatively low molecular weight, resultant short molecule length and high charge density, but that they are good thinners of water swellable clays due to their ability to inhibit the formation of gel structures.

In contrast, research has also shown that partially hydrolyzed polyacrylamide or polyacrylate-polyacrylamide copolymers, which are about 25–40% anionic, such as those used in the prior art, are very good inhibitors of swelling for water swellable clays due to their high molecular weight, resultant very long molecular length and much lower charge density and, that they are very poor water swellable clay thinners due to their inability to fully mask the positive charges on the clay particle edges and thereby inhibit particle to particle orientation and resultant gel formation.

Polymeric clay treatments, such as that of Hughes (U.S. Pat. No. 3,986,365), which provide soil sealants by viscosifying aqueous fluids passing through a soil and clay mixture have high molecular weights of at least about 100,000. Preferred molecular weights are significantly higher, in the range of 500,00 to 2,000,000 or more. These viscosifiers may variously be composed of polyacrylates or polymethacrylates.

High molecular weight polyacrylates and polymethacrylates, such as those used by Hughes, are very good viscosifiers of aqueous liquids due to their extremely long molecular length and resultant ability to form densely tangled molecular networks which inhibit water molecule movement. These polymers are extremely poor water swellable clay thinners due to their inability to fully mask all the positive charges on the clay particle edges and inhibit particle to particle orientation and resultant gel formation.

In contrast, research has shown that polyacrylates of the type used in this invention are extremely poor viscosifiers of aqueous solutions due to their low molecular weight and resultant short molecule length and high charge density.

The use of a polymer thinner in the preferred embodiment of the invention is only one embodiment of the invention and does not preclude the use of other thinner materials, in combination with the polyacrylates described above. Such thinner materials include phosphate thinners, including phosphates, pyrophosphates, polyphosphates, organophosphates, phosphonates and related phosphate compounds, tannins, lignite (leonardite), and lignosulfonates, where the usage rate of these other thinner materials is between 0.1 and 10% of the dry grout mix. Additional embodiments of the present invention also include mixtures of two or more of the thinning agents.

An exemplary grout composition may be prepared by mixing in a suitable mixer 99.7% untreated sodium bentonite clay having a moisture content of 8.0%, which has been finely ground such that 80% passes a 200 mesh U.S. standard sieve, and 0.3% water dispersible, sodium polyacrylate polymer with a molecular weight in the range of 2,000 to 50,000. 50.0 Pounds of this dry composition is added to 12.2 gallons of fresh water to make up a grout slurry which contains approximately 30% fully swellable and reswellable sodium bentonite solids. The percentage of materials in the grout slurry thus prepared, as a percent by weight of the entire grout composition, is approximately 69.6% water, 30.3% sodium bentonite and 0.1% polymer. The dry grout composition has the following typical chemical analysis:

| | |
|---|---|
| $SiO_2$ | 61.47% |
| $Al_2O_3$ | 19.42% |
| $Fe_2O_3$ | 3.93% |
| $Na_2O$ | 3.04% |
| $MgO$ | 1.72% |
| $CaO$ | 1.14% |
| $K_2O$ | 0.73% |
| $TiO_2$ | 0.22% |
| Other | 0.33% |
| Water | 8.00% |

The grout composition thus prepared may be placed either immediately after the dry solids are added to the water while the mixture is still very lumpy, or after mixing until the mixture is of a smooth consistency. This composition remains pumpable indefinitely as long as it is continuously agitated in the mixer. When fully mixed the composition will remain pumpable for approximately one hour in the absence of any agitation. The composition may be effectively pumped to any depth in any hole or cavity of sufficient size to allow passage of the grout conveying tube or pipe. When emplaced, the composition will form a plastic seal exhibiting a water permeability of $1 \times 10^{-8}$ cm /sec., or less, and will retain the capacity to fully reswell upon hydration following shrinkage due to desiccation.

It should be understood that variations and modifications may be made without departing from the spirit, scope or intent of the invention. The foregoing embodiment is, therefore, considered to be illustrative and not restrictive of the invention.

What is claimed is:

1. A reswellable grouting composition which, when mixed with water is useful for effecting a seal in an earthen borehole or other subsurface cavity, wherein the composition consists essentially of 90.0–99.9% water swellable clay and 0.1 to 10.0% thinner, wherein the thinner comprises a water dispersible salt of a polymeric carboxylic acid having a molecular weight of less than about 95,000, where the percentages are by weight of the composition prior to mixing with water.

2. A composition of claim 1 wherein the water swellable clay comprises at least one member selected from the group consisting of beidellite, nontronite, hectorite, saponite, attapulgite, sepiolite and bentonite.

3. A composition of claim 2 wherein the water swellable clay comprises sodium bentonite.

4. A composition of claim 1 wherein the thinner comprises a water dispersible polyacrylate salt.

5. A composition of claim 1 wherein the thinner is a narrow polydispersity, low molecular weight thinner.

6. A composition of claim 1 wherein the thinner has a molecular weight of about 2,000 to 50,000.

7. A composition of claim 1 wherein the thinner has a molecular weight of about 50,000 to 95,000.

8. A composition of claim 1 wherein the thinner further comprises at least one member selected from the group consisting of phosphates, pyrophosphates, organophosphates, phosphonates, tannins, lignites, leonardite and lignosulfonates.

9. A composition of claim 8 wherein the polymer thinner has a molecular weight of about 2,000 to 50,000.

10. A composition of claim 8 wherein the thinner has a molecular weight of about 50,000 to 95,000.

11. A composition of claim 4 wherein the thinner further comprises at least one member selected from the group consisting of phosphates, pyrophosphates, organophosphates, phosphonates, tannins, lignites, leonardite and lignosulfonates.

12. A composition of claim 11 wherein the polymer thinner has a molecular weight of about 2,000 to 95,000.

13. A composition of claim 11 wherein the thinner has a molecular weight of about 50,000 to 95,000.

14. A composition of claim 1 wherein the water swellable clay is finely ground wherein at least about 80% passes a 200 mesh U.S. standard sieve.

15. A reswellable grouting mixture comprising 50 lb. premixed grouting composition consisting essentially of, by weight, 90.0-99.9% water swellable clay and 0.1-10% thinner, wherein the thinner comprises a water dispersible, salt of a polymeric carboxylic acid having a molecular weight in the range of less than about 95,000, mixed with 9-18 gallons of fresh water, wherein the grouting mixture comprises about 25-40% unflocculated and fully reswellable solids.

16. A grouting mixture of claim 15 wherein the thinner comprises a water dispersible polyacrylate salt.

17. A grouting mixture of claim 15 wherein the water swellable clay comprises at least one member selected from the group consisting of beidellite, nontronite, hectorite, saponite, attapulgite, sepiolite and bentonite.

18. A grouting mixture of claim 17 wherein the water swellable clay comprises sodium bentonite.

19. A grouting mixture of claim 15 wherein the water swellable clay is finely ground and wherein at least about 80% passes a 200 mesh U.S. standard sieve.

20. A grouting mixture of claim 15 wherein the grouting composition comprises 98.0-99.9% sodium bentonite and 0.1-2.0% polyacrylate thinner.

21. A grouting mixture of claim 15 wherein the thinner has a molecular weight of about 2,000 to 50,000.

22. A grouting mixture of claim 15 wherein the thinner has a molecular weight of about 50,000 to 95,000.

23. A grouting mixture of claim 15 wherein the thinner further comprises at least one member selected from the group consisting of phosphates, pyrophosphates, organophosphates, phosphonates, tannins, lignites, leonardite and lignosulfonates.

24. A method of forming an unflocculated, fully reswellable grouting mixture useful for effecting a seal in an earthen borehole or other subsurface cavity, comprising adding a premixed grouting composition consisting essentially of 90.0.99-9% water swellable clay and 0.1-10.0% thinner, wherein the thinner comprises a water dispersible sodium salt of a polymeric carboxylic acid having a molecular weight less than about 95,000, to 9-18 gallons of fresh water wherein the grouting mixture comprises about 25-40% unflocculated and fully reswellable solids, agitating the mixture until the water swellable clay and thinner are at least partially dispered in the water, and pumping the mixture into the subsurface cavity.

25. A method of claim 24 wherein the thinner comprises a water dispersible polyacrylate salt.

26. A method of claim 24 wherein the water swellable clay comprises at least one member selected from the group consisting of beidellite, nontronite, hectorite, saponite, attapulgite, sepiolite and bentonite.

27. A method of claim 26 wherein the water swellable clay comprises sodium bentonite.

28. A method of claim 24 wherein the water swellable clay is finely ground and wherein at least about 80% passes a 200 mesh U.S. standard sieve.

29. A method of claim 25 wherein the grouting composition comprises 98.0-99.9% sodium bentonite and 0.1-2.0% polyacrylate thinner.

30. A method of claim 24 wherein the thinner has a molecular weight of about 2,000 to 50,000.

31. A method of claim 24 wherein the thinner has a molecular weight of about 50,000 to 95,000.

32. A method of claim 24 wherein the thinner further comprise at least one member selected from the group consisting of phosphates, pyrophosphates, organophosphates, phosphonates, tannins, lignites, leonardite and lignosulfonates.

33. A method of claim 24 wherein the grouting composition is mixed with 11-14 gallons of fresh water and wherein the grouting mixture comprises about 30-35% unflocculated and fully reswellable solids.

* * * * *